(12) United States Patent
Carrott et al.

(10) Patent No.: US 6,285,493 B1
(45) Date of Patent: Sep. 4, 2001

(54) ELECTRO-ACOUSTIC-OPTICAL APPARATUS AND METHOD OF CALIBRATING SAME

(75) Inventors: David T. Carrott, Bristow, VA (US); Mahir A. Nayfeh, Catonsville, MD (US)

(73) Assignee: Tasc, Inc., Reading, MA (US)

( * ) Notice: Subject to any disclaimer, the term of this patent is extended or adjusted under 35 U.S.C. 154(b) by 0 days.

(21) Appl. No.: 09/629,157

(22) Filed: Jul. 31, 2000

(51) Int. Cl.$^7$ ........................................ G02F 1/33
(52) U.S. Cl. ............................. 359/311; 359/305
(58) Field of Search ..................... 359/305, 311, 359/308, 309, 310, 312, 313, 314

(56) References Cited

U.S. PATENT DOCUMENTS 6,043,924 * 3/2000 Montgomery et al. ............... 359/305

OTHER PUBLICATIONS

A.W. Houghton et al, "Spread Spectrum Signal Detection Using a Cross Correlation Receiver," HMSO London, 1995.

* cited by examiner

Primary Examiner—Hung Xuan Dang
(74) Attorney, Agent, or Firm—Lowe Hauptman Gilman & Berner, LLP

(57) ABSTRACT

An optically defractive medium of a Bragg cell has a moving grating induced therein in response to acoustic waves propagating in the medium. First and second electro-acoustic transducers coupled to the medium launch first and second acoustic waves toward each other in response to electric excitation of the transducers to produce a moving grating having an amplitude proportional to the difference in the amplitude of the first and second acoustic waves. A laser illuminates the medium and an optical detector array including plural individual detector elements responds to optical energy from the source, as modulated by the moving grating. A processor responds to the detector elements to derive an indication of time difference of arrival of first and second electric signals that respectively drive the first and second transducers. Anomalies of a system including the cell are detected by simultaneously driving the first and second transducers with the same electric signal and detecting the amplitude of light incident on a detector which should have a zero light amplitude incident on it under these circumstances.

12 Claims, 2 Drawing Sheets

ELECTRO-ACOUSTIC-OPTICAL APPARATUS AND METHOD OF CALIBRATING SAME

FIELD OF THE INVENTION

The present invention relates generally to apparatus using electro-acoustic-optical devices and to a method of calibrating same and, more particularly, to a signal combiner using such a device, wherein acoustic waves are launched in the device in opposite directions toward each other. Another aspect of the invention relates to an electro-acoustic-optical device having transducers for launching acoustic waves toward each other in the device.

BACKGROUND ART

Electro-acoustic-optical devices include an optically defractive medium capable of having a moving optical grating induced in it in response to acoustic waves propagating therein. An electro-acoustic transducer, usually mounted at one end of the medium, launches acoustic waves in the defractive medium in response to electric excitation of the transducer. Such devices are used in time integrating correlators and apparatus for determining time difference of arrival of two signals.

FIG. 1 is a schematic diagram of a prior art device for determining the time difference of arrival of signals that RF sources 10 and 12 derive. RF sources 10 and 12 are typically continuous wave sources having phases representing positions of objects being tracked. The signals that sources 10 and 12 derive are linearly combined in electronic difference circuit 14 that derives an output signal having an amplitude directly proportional to the difference between the instantaneous amplitudes of the signals sources 10 and 12 derive. The difference signal that circuit 14 derives drives piezoelectric crystal 16, bonded to one end of optically diffractive medium 17 that forms Bragg cell 18. Piezoelectric crystal 16 responds to the signal from circuit 14 to launch an acoustic wave in medium 17. The acoustic wave induces a moving optical grating in medium 17. Medium 17 is formed as an elongated cell, and crystal 16 is arranged such that acoustic waves propagate in the elongated direction of the cell. Typically medium 17 is made of gallium phosphide (GaP), which is favorably employed because it has high bandwidths of, for example, 2 GHz.

Laser source 20 derives an unmodulated coherent optical beam 22 that illuminates a center portion of cell 18. Beam 22 is incident on a first front face of cell 18 and is displaced from a line perpendicular to the propagation direction of the acoustic waves in cell 18 by the Bragg angle of the refractive material in medium 17.

Cell 18 responds to the moving optical grating crystal 16 induces in it to diffract and amplitude modulate the coherent energy in beam 22. The modulated coherent energy in beam 22 emerges from cell 18 as a series of beamlets propagating from the second, back face of the cell. The deflection angles of beamlets 24 are determined by the diffractive index of the medium 17 where the beam 22 is incident on the medium; the refractive index is determined by the amplitude of the acoustic waves propagating in the cell.

Beamlets 24 are incident on collimating lens 26 which converts the beamlets into parallel beamlets 28 which are incident on photoelectric detector array 30. Photoelectric detector array 30 includes many detector elements 32, each of which derives a separate variable amplitude output signal commensurate with the amplitude of the optical energy in the beamlet 28 incident thereon. Detector elements 32 are arranged in linear array 30 that extends in the same direction as the propagation direction of the acoustic energy in cell 18. Electric leads in bus 33 supply the signals that detector elements 32 derive to processor 34, which compares the amplitudes of the outputs of detector elements 32 to derive signals indicative of the amplitudes of the optical energy incident on each of detector elements 32 and an indication of which detector 32 has the highest amplitude optical energy incident thereon. Processor 34 responds to the amplitudes of the signals in bus 33 to derive an indication of the difference in time of arrival (i.e., the phase difference) of the signals that sources 10 and 12 derive.

We realize that a problem with the apparatus illustrated in FIG. 1 is a tendency for difference circuit 14 to combine the output signals of sources 10 and 12 in such a manner that the signal which actually drives piezoelectric crystal 16 is not exactly equal to the difference between the signals of RF sources 10 and 12. Consequently, when RF sources 10 and 12 are identical to each other and are supplied at exactly the same time, i.e., with the same phase, to difference circuit 14, the difference circuit frequently does not produce a zero output signal. Consequently, processor 34 does not derive an accurate indication of the time difference of arrival of the signals that sources 10 and 12 derive.

Bragg cell 18 has also been used in time integrating correlators which determine the time difference of arrival of RF signal sources 10 and 12. The correlator illustrated in FIG. 2 includes Bragg cell 18, responsive to a coherent optical wave that RF source 10 amplitude modulates. A moving optical grating is induced in cell 18 in response to RF source 12.

To these ends, source 10 directly amplitude modulates coherent wave beam 41 laser 40 derives. Coherent wave beam 41 is incident on diverging lens 42 which produces a diverging beam 43 incident on collimating lens 44. Lens 44 supplies collimated, coherent optical wave beam 45 to a first, input face of Bragg cell 18, which defracts the optical beam incident on it as a function of the moving optical grating induced in the cell as a result of the acoustic waves that piezoelectric crystal 16 launches in the cell. Crystal 16 responds to a signal including the variations of RF source 12, as modified by DC bias source 46 and by RF carrier source 50, typically having a frequency of about 2 GHz. Electronic adder 48 combines the RF output signal of source 12 and the DC bias of source 46 to produce an electronic sum signal that is heterodyned in mixer 52 with the RF carrier wave which source 50 derives. Mixer 52 produces an amplitude modulated electric wave having approximately a 2 GHz carrier. The output signal of mixer 52 drives crystal 16.

Bragg cell 18 responds to the optical energy in beam 45 and the acoustic wave launched by crystal 16 to produce an amplitude modulated optical beam that drives a spatial filter including focussing lens 54 and collimating lens 56, such that focussing lens 54 responds to the output beam of Bragg cell 18 and collimating lens 56 produces a collimated beam that is incident on detector elements 32 of detector array 30. Each of detector elements 32 produces an electric signal having an amplitude indicative of the optical energy incident thereon. Bus 33 supplies these signals to processor 34 which responds to them to indicate the relative time of arrival of the signals of RF sources 10 and 12 at the inputs of laser 14 and crystal 16, respectively.

A problem with the apparatus illustrated in FIG. 2, which is described in an article by Houghton et al., entitled "Spread Spectrum Signal Detection Using a Cross-Correlation Receiver," HMSO London 1995, is that it ignores transform errors between the different wave domains formed as a result of the signal from RF source 10 being transduced into an optical wave and the RF signal of source 12 being transduced into an acoustic wave.

It is, accordingly, an object of the present invention to provide a new and improved time difference of arrival detecting apparatus.

Another object of the invention is to provide a new and improved electro-acoustic-optical device.

A further object of the invention is to provide a new and improved electro-acoustic-optical device and to an apparatus for using same, wherein waves that are combined in an optical defracting medium are launched in the same wave domain.

An additional object of the invention is to provide an electro-acoustic-optical device that enables a system in which it is used to be easily callibrated.

A further object of the invention is to provide a new and improved method of calibrating a system including an electro-acoustic-optical device.

SUMMARY OF THE INVENTION

In accordance with one aspect of the invention, an electro-acoustic-optical device includes an optically defractive medium capable of having a moving optical grating induced in it in response to acoustic waves propagating therein. First and second electro-acoustic transducers, such as piezoelectric crystals, coupled to the optically defractive medium launch first and second acoustic waves toward each other in the medium in response to electric excitation of the transducers. The transducers are positioned and arranged so that the first and second acoustic waves interact with each other in the medium. In the preferred embodiment, the first and second transducers are at opposite ends of the medium and the medium is formed as a Bragg cell.

Another aspect of the invention is directed to an apparatus for combining replicas of first and second electric signals or for determining a characteristic of the apparatus which combines these signals in response to a third electric signal. The apparatus comprises an optically defractive medium capable of having a moving optical grating induced therein in response to acoustic waves propagating therein. First and second electro-acoustic transducers coupled to the optically defractive medium launch first and second acoustic waves toward each other in response to electric excitation of the first and second transducers by at least one of the signals. The transducers are positioned and arranged so that the first and second acoustic waves interact with each other in the medium. The apparatus also includes an optical source for illuminating the medium and an optical detector arranged to be responsive to optical energy from the source and modulated by the moving grating.

In the preferred embodiment, the detector arrangement includes plural individual detector elements positioned in an array that extends in the same direction as the direction the acoustic waves propagate in the cell between the transducers. The optical source is preferably coherent and arranged for projecting a beam that is incident on the defractive medium at an angle displaced from the acoustic wave propagation direction by the complement of the Bragg angle of the defractive material. In the preferred embodiment, the detector arrangement includes plural individual detector elements positioned in an array that extends in the same direction as the direction the acoustic waves propagate.

To calibrate the aforementioned apparatus, the third electric signal simultaneously drives the first and second transducers. Because the same signal simultaneously drives the transducers, there should be 100% cancellation, i.e., interference, of the acoustic waves propagating in the medium. As the cycles of the two acoustic waves approach a match to each other, from opposite sides, any circuitry or laser anomalies are indicated by the detector. The levels of the outputs of the detectors under these circumstances are stored to indicate output levels of the detectors associated with the anomalies. The stored values are supplied to a processor to correct measured inputs when the apparatus responds to replicas of the first and second electric signals that are combined in the medium, e.g., to determine time difference of arrival.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWING

As described.

DESCRIPTION OF THE PREFERRED EMBODIMENT

Figure 1:
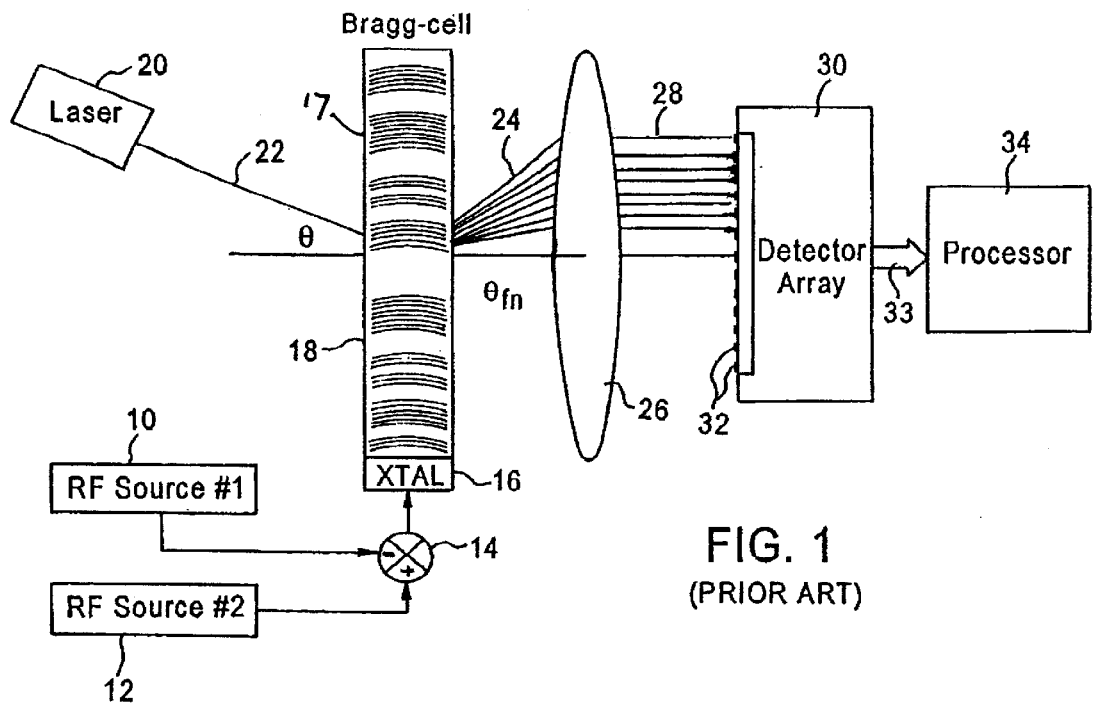
FIGS. 1 and 2 are schematic diagrams of prior apparatuses employing Bragg cells for determining time difference of arrival of two RF signals.
Figure 3:
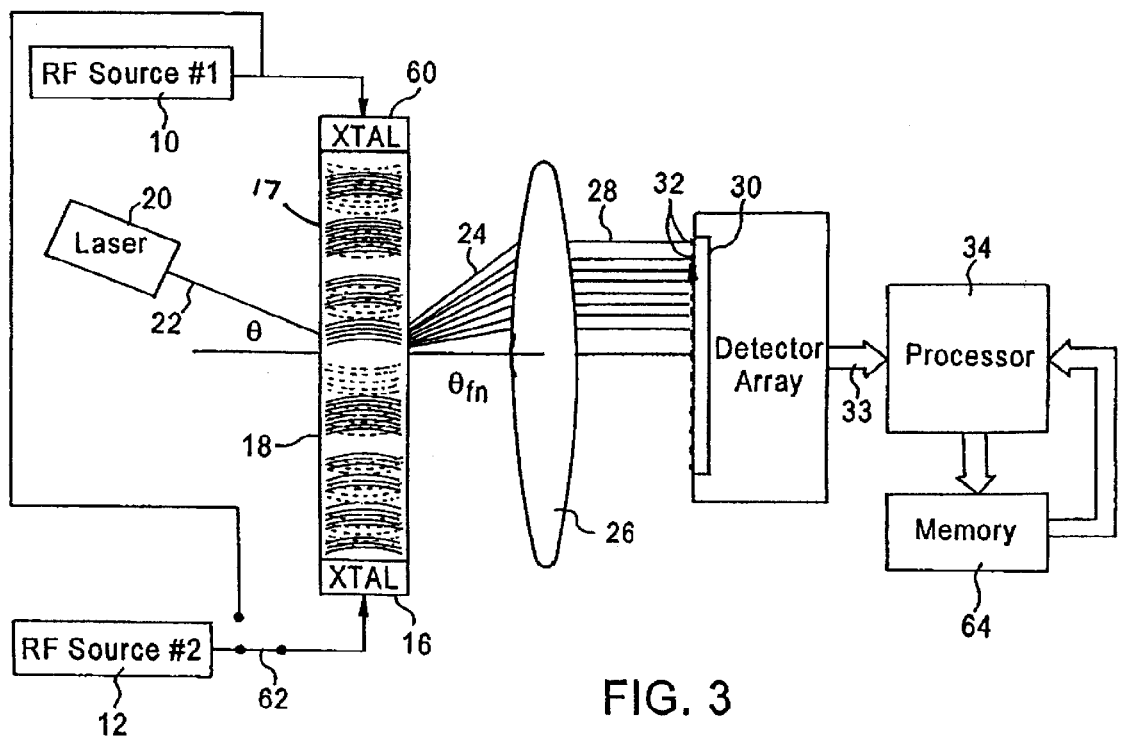
FIG. 3 is a schematic diagram of a preferred embodiment of an apparatus using a Bragg cell responsive to opposing acoustic waves for determining time difference of arrival of two RF sources.
Figure 2:
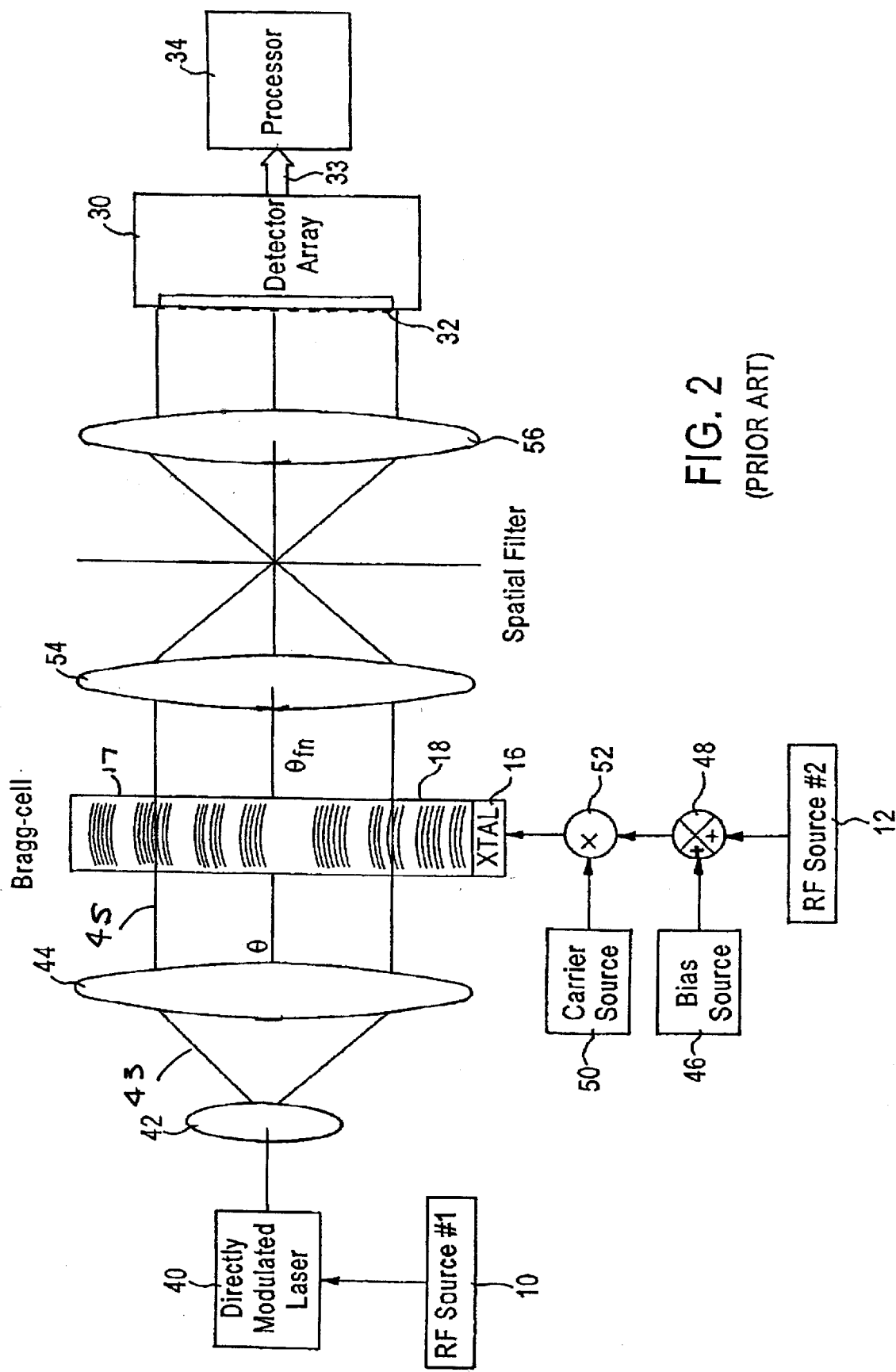

The apparatus of FIG. 3 for determining the time difference of arrival of the output signals of RF sources 10 and 12 is quite similar to the prior art illustrated in FIG. 1. The principal difference between the apparatus illustrated in FIG. 3 and the prior art of FIG. 1 is that Bragg cell 18 of FIG. 3 includes piezoelectric crystals 16 and 60 that are bonded to opposite ends of medium 17. RF sources 10 and 12 respectively drive crystals 60 and 16. Crystals 60 and 16 respond to the output signals of sources 10 and 12 to launch acoustic waves toward each other, i.e., in opposite directions, in Bragg cell 18. The acoustic waves crystals 16 and 60 launch in cell 18 are replicas of the signals sources 10 and 12 derive. The acoustic waves crystals 16 and 60 launch are moving optical gratings that combine in a linear manner in Bragg cell 18 so that, at any point along the Bragg cell between crystals 16 and 60, the amplitude of the acoustic wave is equal to the difference between the instantaneous amplitudes of the waves that crystals 16 and 60 launch, as coupled to that particular point. The length of cell 18 between crystals 16 and 60 is such that the acoustic waves from crystals 16 and 60 interact with each other in the cell and undergo insubstantial attenuation while propagating in the cell.

Assume that the amplitude, at a point di from crystal 16, of the acoustic wave crystal 16 launches in cell 18 is A $\sin(\omega_1 t + \phi_1)$, where $\omega_1$ is the angular frequency of the acoustic wave crystal 16 launches in cell 18 and $\phi_1$ is the phase displacement of the acoustic wave as a result of it propagating from the end face of cell 18 to which crystal 16 is bonded to the point $d_1$. Also, assume the amplitude of the acoustic wave crystal 60 launches in cell 18 at the same point $d_1$ is B $\sin((\omega_2 t + \phi_2)$, where $\omega_2$ is the angular frequency of the acoustic wave crystal 60 launches in cell 18 and $\phi_2$ is the phase shift the acoustic wave undergoes in propagating through cell 18 from the end face of cell 18 where crystal 60 is located to the point $d_1$. The two acoustic waves are linearly combined at point $d_1$ in accordance with:

$$A \sin(\omega_1 t+\phi_1) - B \sin(\omega_2 t+\phi_2). \qquad (1)$$

Typically, $\omega_1$ and $\omega_2$ are the same or are shifted from each other slightly, due to Doppler effects of objects which originally derive the signals that sources 10 and 12 derive. When $\omega_2$ is shifted slightly from $\omega_1$, the combination of the two acoustic waves is a beat. Hence, at point di from the end face of cell 18 where crystal 16 is bonded, the amplitude of the coherent optical wave emerging from the second, outlet side of cell 18 is modulated in amplitude in accordance with $A \sin(\omega_1 t+\phi_1) - B \sin(\omega_2 t+\phi_2)$, where A and B are the maximum amplitudes of the acoustic waves crystals 16 and 60 respectively apply to the end faces of cell 18.

Consequently, each of detector elements 32 in detector array 30 derives an output signal commensurate with the differences in amplitude, frequency and phase of the acoustic waves that crystals 16 and 60 launch in cell 18. The different signals that elements 32 derive have different phases and amplitudes, depending on the point on the second, outlet side of cell 18 from which the beamlet 28 incident on the particular detector element 32 emerges. Processor 34 responds to the amplitudes of the signals incident on the different detector elements 32, as coupled to the processor by signal bus 33. Processor 34 responds to these signals to determine time difference of arrival of RF sources 10 and 12 in the same manner that processor 34 derives this information in the prior art arrangement of FIG. 1. The relative phase angle of the signals at detector elements 32 is measured by processor 34 to determine the time difference of arrival of the signals that sources 10 and 12 derive.

Prior to the apparatus of FIG. 3 being used to determine time difference of arrival of the signals of sources 10 and 12, the apparatus of FIG. 3 is calibrated by activating switch 62 so that source 10 drives crystals 16 and 60 in parallel and source 12 is decoupled from crystal 16. The lengths of the leads between source 10 and crystals 16 and 60 are adjusted so that the crystals and cell 18 are simultaneously driven by waves desirably having exactly the same phase and amplitude. Consequently, the values of A and B are theoretically the same, as are the values of $\omega_1$ and $\omega_2$. Callibration is performed by selecting the beamlet 28 which corresponds with $\phi_1$ being equal to $\phi_2$. Under idealized conditions, there is complete cancellation of the two acoustic waves at the point in cell 18 associated with $\phi_1 = \phi_2$. Complete cancellation occurs if crystals 16 and 60 have exactly the same response characteristics and the electronic circuits between source 10 and crystals 16 and 60 are identical. However, because of anomalies, there is a low likelihood of (1) crystals 16 and 60 having exactly the same characteristics to launch acoustic waves having exactly the same amplitude in cell 18 and (2) the electronic circuits between source 10 and crystals 16 and 60 being identical. Consequently, the beamlet 28 which should have zero amplitude usually, in fact, has a finite amplitude.

The apparatus of FIG. 3 enables these anomalies to be detected and used to obtain accurate data during operation in response to signal sources 10 and 12. To these ends, processor 34 responds to the output of detector element 32 responsive to the beamlet 28 which should have zero amplitude to detect the actual amplitude of the detector element when source 12 drives crystals 16 and 60. Processor 34 supplies memory 64 with a signal indicative of this finite amplitude. In addition, processor 34 responds to the output amplitudes of each of the remaining detector elements 32 in array 30 to supply memory 64 with error signals indicative thereof Memory 64 stores each of these error signal values.

During operation, when the time difference of arrival of the signals of sources 10 and 12 is detected, switch 62 is activated to the shown position, such that sources 10 and 12 respectively drive crystals 60 and 16. The resulting output signals of detector elements 32 are modified by the error signal values memory 64 stored during the calibration operation. Processor 34 responds to the modified output signals to derive the time difference of arrival indication.

While there has been described and illustrated a specific embodiment of the invention, it will be clear that variations in the details of the embodiment specifically illustrated and described can be made without departing from the true spirit and scope of the invention as defined in the appended claims.

We claim:

1. An electro-acoustic-optical device comprising an optically diffractive medium capable of having a moving optical grating induced therein in response to acoustic waves propagating therein, first and second electro-acoustic transducers coupled to the optically diffractive medium for launching first and second acoustic waves toward each other in the optically diffractive medium in response to electric excitation of the first and second transducers, the transducers being positioned and arranged so that the first and second acoustic waves interact with each other in the medium.

2. The electro-acoustic-optical delay of claim 1 wherein the first and second transducers are at opposite ends of the medium.

3. The electro-acoustic-optical delay of claim 1 wherein the medium includes a Bragg cell.

4. Apparatus for combining first and second electric signals or for determining a characteristic of the apparatus in response to a third electric signal, the apparatus comprising an optically diffractive medium capable of having a moving optical grating induced therein in response to acoustic waves propagating therein, first and second electro-acoustic transducers coupled to the optically diffractive medium for launching first and second acoustic waves toward each other in the optically diffractive medium in response to electric excitation of the first and second transducers, the transducers being positioned and arranged so that the first and second acoustic waves interact with each other in the medium, an optical source for illuminating the medium, and an optical detector arrangement arranged to be responsive to optical energy from the source and modulated by the moving grating.

5. The apparatus of claim 4 wherein the acoustic waves propagate in a direction between the transducers, the detector arrangement including plural individual detector elements positioned in an array that extends in the same direction as the direction the acoustic waves propagate.

6. The apparatus of claim 5 further including a processor for signaling which detector element derives an output indicating the light incident on it has the largest value.

7. The apparatus of claim 6 wherein the optical source is coherent and is arranged for projecting a beam that is incident on the medium at an angle that differs from a line normal to the acoustic wave propagation direction by the Bragg angle of the diffractive material.

8. The apparatus of claim 4 wherein the optical source is coherent and is arranged for projecting a beam that is incident on the medium at an angle that differs from a line normal to the acoustic wave propagation direction of the Bragg angle of the diffractive material.

9. A method of calibrating a system including an optically refractive medium for refracting optical energy in response to acoustic waves propagating therein, as well as first and second electro-acoustic transducers coupled to the optically refractive medium for launching first and second acoustic waves toward each other in the optically refractive medium in response to electric signals supplied to the first and second transducers, the transducers being positioned and arranged so that the first and second acoustic waves interact with each other in the medium, the method comprising simultaneously supplying the same electric signal to the transducers while an optical beam is incident on the refractive medium, and detecting the amplitude of optical energy propagating through the medium while the optical beam is incident on the refractive medium.

10. The method of claim 9 wherein the amplitude of the optical energy propagating through the medium is detected for numerous regions of the diffractive medium in the direction of acoustic wave propagation.

11. The method of claim 10 further including deriving correction coefficients from the detected amplitudes for the numerous regions.

12. A method of operating the system of claim 11 comprising simultaneously supplying first and second electric signals to the first and second transducers while an optical beam is incident on the refractive medium, detecting the amplitude of the optical energy propagating through the medium at numerous regions of the diffractive medium in the direction of acoustic wave propagation while the first and second electric signals are applied to the first and second transducers and the optical beam is incident on the refractive medium, and applying the correction coefficients to the detected amplitude of the optical energy propagating through the medium while the first and second electric signals are applied to the first and second transducers and the optical beam is incident on the refractive medium.

* * * * *